US012699358B2

(12) United States Patent　　　　　(10) Patent No.:　　US 12,699,358 B2
Halko et al.　　　　　　　　　　　　　(45) Date of Patent:　　　　Aug. 4, 2026

(54) APPARATUS WITH A DISPLAY

(71) Applicant: Suunto Oy, Vantaa (FI)

(72) Inventors: Timo Halko, Vantaa (FI); Mikko Ahlström, Vantaa (FI); Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 732 days.

(21) Appl. No.: 17/699,422

(22) Filed: Mar. 21, 2022

(65) Prior Publication Data

US 2022/0308528 A1　　Sep. 29, 2022

(30) Foreign Application Priority Data

Mar. 26, 2021　(FI) ..................................... 20215351

(51) Int. Cl.
*G04G 9/00*　　　　(2006.01)
*G04G 21/02*　　　(2010.01)
(Continued)

(52) U.S. Cl.
CPC ........... *G04G 9/007* (2013.01); *G04G 21/025* (2013.01); *G04G 21/08* (2013.01); *G06F 3/0485* (2013.01); *G06T 11/26* (2026.01)

(58) Field of Classification Search
CPC .... G06F 3/0485; G06F 1/163; G06F 3/04842; A61B 5/4806; A61B 5/4809;
(Continued)

(56) References Cited

U.S. PATENT DOCUMENTS 9,869,973　B2 *　1/2018　Raymann ............. A61B 5/4815
10,517,527　B2 *　12/2019　Ware ........................ A61B 7/04
(Continued)

FOREIGN PATENT DOCUMENTS

FI　　　　20185580 A1　12/2019
JP　　　2019162382 A　　9/2019
(Continued)

OTHER PUBLICATIONS

Google search for "average non-zero values before:2020-01-01" (Year: 2024).*

(Continued)

*Primary Examiner* — Edwin A. Leon
(74) *Attorney, Agent, or Firm* — Laine IP Oy

(57)　　　　　　　ABSTRACT

There is provided a wearable device comprising at least one processor; and at least one memory including computer program code, the at least one memory and the computer program code configured to, with the at least one processor, cause the wearable device at least to perform: obtaining a starting time of a latest sleeping period; obtaining an ending time of the latest sleeping period; displaying, on a display of the wearable device, a first line illustrating an average starting time of a sleeping period calculated based on a plurality of sleeping periods over a plurality of days; displaying a second line illustrating an average ending time of a sleeping period calculated based on the plurality of sleeping periods over the plurality of days; and displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period.

19 Claims, 8 Drawing Sheets

(51) Int. Cl.
G04G 21/08      (2010.01)
G06F 3/0485      (2022.01)
G06T 11/26      (2026.01)

(58) Field of Classification Search
CPC ... A61B 5/4812; A61B 5/4815; A61B 5/4818; A61B 5/681; A61B 5/742; G06T 11/26
See application file for complete search history.

(56) References Cited

U.S. PATENT DOCUMENTS

| | | | |
|---|---|---|---|
| 10,594,856 B1 * | 3/2020 | He | .................... H04M 1/72466 |
| 2011/0263993 A1 | 10/2011 | Martikka et al. | |
| 2012/0245745 A1 * | 9/2012 | Vandevelde | ........... H02S 50/00 |
| | | | 700/286 |
| 2014/0347366 A1 | 11/2014 | Emori et al. | |
| 2015/0339792 A1 | 11/2015 | Emori et al. | |
| 2017/0156666 A1 | 6/2017 | Surbur et al. | |
| 2017/0357217 A1 | 12/2017 | Raymann et al. | |
| 2018/0061098 A1 | 3/2018 | Kim et al. | |
| 2018/0070840 A1 * | 3/2018 | Cronin | ................. A61B 5/7435 |
| 2018/0078197 A1 | 3/2018 | Ware et al. | |
| 2019/0287531 A1 * | 9/2019 | Tsukada | .................. G10L 15/22 |

FOREIGN PATENT DOCUMENTS

| | | |
|---|---|---|
| JP | 2020000306 A | 1/2020 |
| WO | WO2018155951 A1 | 8/2018 |

OTHER PUBLICATIONS

StackOverflow forum answer, hosted at https://stackoverflow.com/questions/41603334/computing-average-of-non-zero-values, captured by the Internet Archive Jan. 13, 2017 (Year: 2017).*
Firstbeat Technologies: a Sleep Analysis Method Based on Heart Rate Variability. Oct. 30, 2019.
Wikipedia: Wearable computer. Feb. 21, 2021.

* cited by examiner

600

620

630

320

610

640

310

650

700

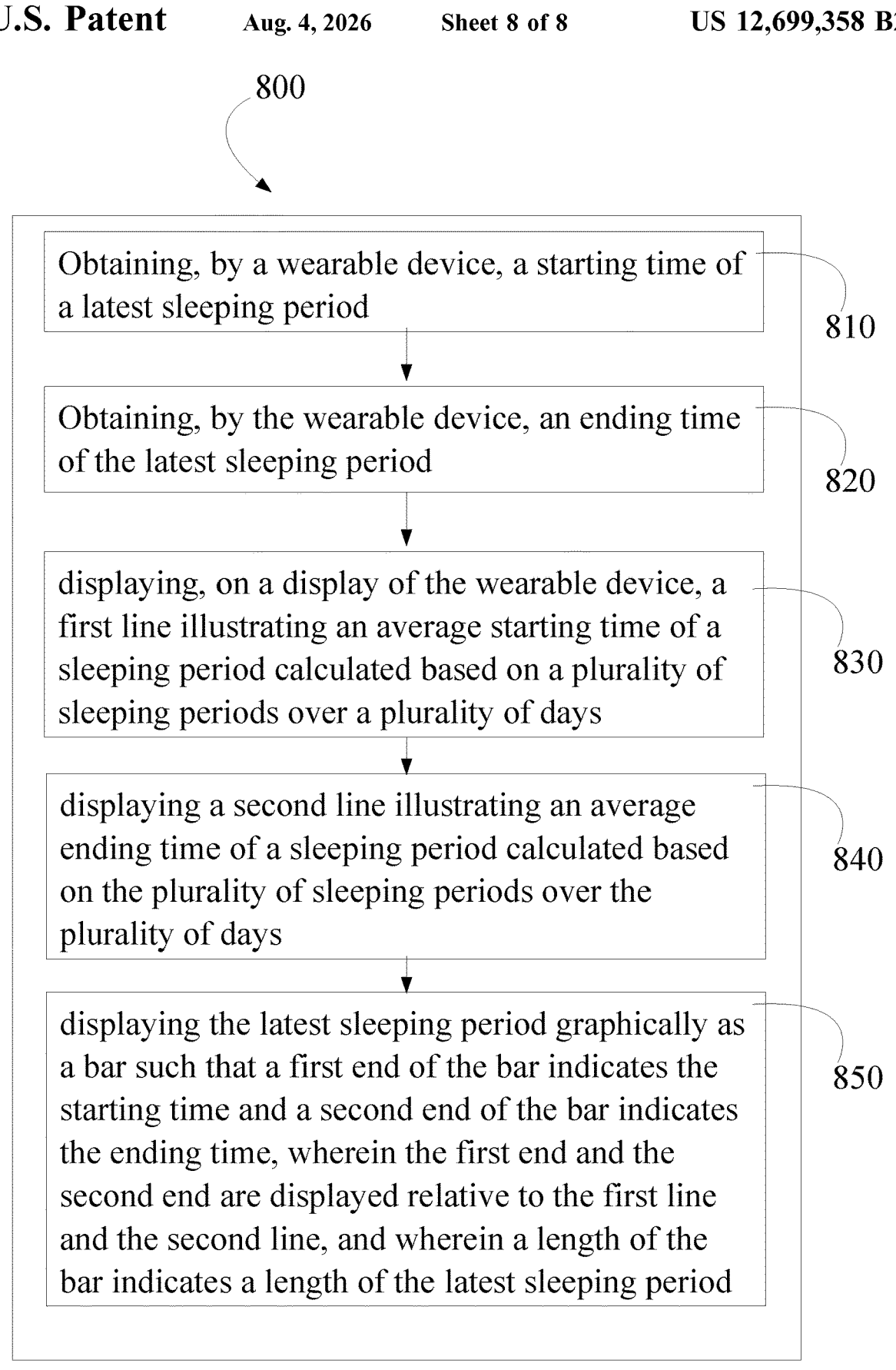

800

Obtaining, by a wearable device, a starting time of a latest sleeping period   810

Obtaining, by the wearable device, an ending time of the latest sleeping period   820 displaying, on a display of the wearable device, a first line illustrating an average starting time of a sleeping period calculated based on a plurality of sleeping periods over a plurality of days   830 displaying a second line illustrating an average ending time of a sleeping period calculated based on the plurality of sleeping periods over the plurality of days   840 displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period   850

Fig. 8

APPARATUS WITH A DISPLAY

FIELD

Various example embodiments relate to apparatuses with a display.

BACKGROUND

A user interface, UI, enables a user to interact with a device, such as a mobile phone or a wearable device. Information may be presented to a user via the UI, and the user may provide input to the device via the UI. A display is a common part of a user interface.

Some devices may have a display with a limited size. Thus, it may be cumbersome for a user to see and understand the information presented on a display.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided a wearable device comprising at least one processor; and at least one memory including computer program code, the at least one memory and the computer program code configured to, with the at least one processor, cause the wearable device at least to perform: obtaining a starting time of a latest sleeping period; obtaining an ending time of the latest sleeping period; displaying, on a display of the wearable device, a first line illustrating an average starting time of a sleeping period calculated based on a plurality of sleeping periods over a plurality of days; displaying a second line illustrating an average ending time of a sleeping period calculated based on the plurality of sleeping periods over the plurality of days; and displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period.

According to a second aspect, there is provided a method comprising: obtaining, by a wearable device, a starting time of a latest sleeping period; obtaining, by the wearable device, an ending time of the latest sleeping period; displaying, on a display of the wearable device, a first line illustrating an average starting time of a sleeping period calculated based on a plurality of sleeping periods over a plurality of days; displaying a second line illustrating an average ending time of a sleeping period calculated based on the plurality of sleeping periods over the plurality of days; and displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period.

According to an embodiment, the method comprises displaying a plurality of sleeping periods, comprising the latest sleeping period and previous sleeping periods, as bars such that first ends of the bars indicate starting times of the sleeping periods and second ends of the bars indicate ending times of the sleeping periods, wherein the first ends and the second ends are displayed relative to the first line and the second line, and wherein lengths of the bars indicate lengths of the sleeping periods.

According to an embodiment, the method comprises assigning a date for a sleeping period of the plurality of sleeping periods based on the ending time of the sleeping period; and displaying the plurality of sleeping periods as bars adjacently in a graph such that slots in the graph are reserved for different dates.

According to an embodiment, the method comprises assigning a same date for a plurality of sleeping periods with ending times on a same day; displaying that sleeping period of the plurality of sleeping periods with ending times on the same day which is nearest to an average sleeping period of a user.

According to an embodiment, the method comprises calculating a running average length of sleeping periods over the plurality of days; and displaying the running average length of sleeping periods.

According to an embodiment, the calculation of the running average discards one or more days of the plurality of days without recorded sleeping period(s).

According to an embodiment, the method comprises assigning a same date for a plurality of sleeping periods with ending times on a same day; calculating a running average length of sleeping periods over the plurality of days taking into account the plurality of sleeping periods assigned the same date by dividing total duration of sleep during the plurality of days with a number of the plurality of sleeping periods during the plurality of days.

According to an embodiment, the plurality of days is seven days.

According to an embodiment, the method comprises detecting a change of a time zone; displaying the plurality of sleeping periods such that the starting times and the ending times are displayed as obtained.

According to an embodiment, the method comprises in response to detecting that the ending times of subsequent sleeping periods have a time zone difference, displaying an indicator of the change of the time zone.

According to an embodiment, the method comprises in response to detecting a change of a time zone during a sleeping period, applying a time zone correction to the starting time of the sleeping period.

According to an embodiment, the first line and the second line are displayed in fixed positions on the display, despite of a change of time(s) that the first line and/or the second line illustrate(s).

According to an embodiment, the method comprises receiving user input via the display, wherein the user input is a swiping action for scrolling the graph forward and/or backward.

According to an embodiment, the method comprises displaying bars, that become visible on the display in response to the swiping action and are indicative of sleeping periods in history, relative to the first line illustrating the average starting time of the sleeping period calculated based on the plurality of sleeping periods over the plurality of days; and the second line illustrating the average ending time of the sleeping period calculated based on the plurality of sleeping periods over the plurality of days, wherein the plurality of days are the latest days with respect to a current day.

According to a third aspect, there is provided a non-transitory computer readable medium comprising program instructions that, when executed by at least one processor, cause a wearable device at least to perform: obtaining, by the wearable device, a starting time of a latest sleeping period; obtaining, by the wearable device, an ending time of the latest sleeping period; displaying, on a display of the wearable device, a first line illustrating an average starting time of a sleeping period calculated based on a plurality of sleeping periods over a plurality of days; displaying a second line illustrating an average ending time of a sleeping period calculated based on the plurality of sleeping periods over the plurality of days; and displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period.

According to various embodiments, the non-transitory computer readable medium comprises program instructions that, when executed by at least one processor, cause a wearable device at least to perform any of the embodiments of the second aspect.

According to a further aspect, there is provided a computer program configured to cause a method in accordance with the second aspect and the embodiments thereof to be performed.

BRIEF DESCRIPTION OF THE DRAWINGS

FIG. 8 shows, by way of example, a flowchart of a method.

DETAILED DESCRIPTION

Many users are interested in monitoring their sleep. Sleep monitors or sleep trackers may be integrated into wearable devices such as smart watches, smart rings and/or activity bracelets. The sleep trackers may be configured to detect beginning of the sleep and waking up based on sensor readings, such as motion sensor readings and heart rate sensor readings. Heart rate may be measured, for example, based on optical heart rate sensors, which is comfortable for the user during sleeping, since the user may sleep without wearing a heart rate belt for measuring the heart rate.

Some displays, for example displays of wearable devices, may have limited space for displaying sleeping data. Wearable devices with display comprise, for example, smart watches, sport watches, activity bracelets, smart necklace or pendant.

Herein is provided a device, e.g. a wearable device, which is configured to display sleep data and enable a user to review past data relating to the sleep of the user, such as a history of sleep data, via a user interface.

Figure 1:
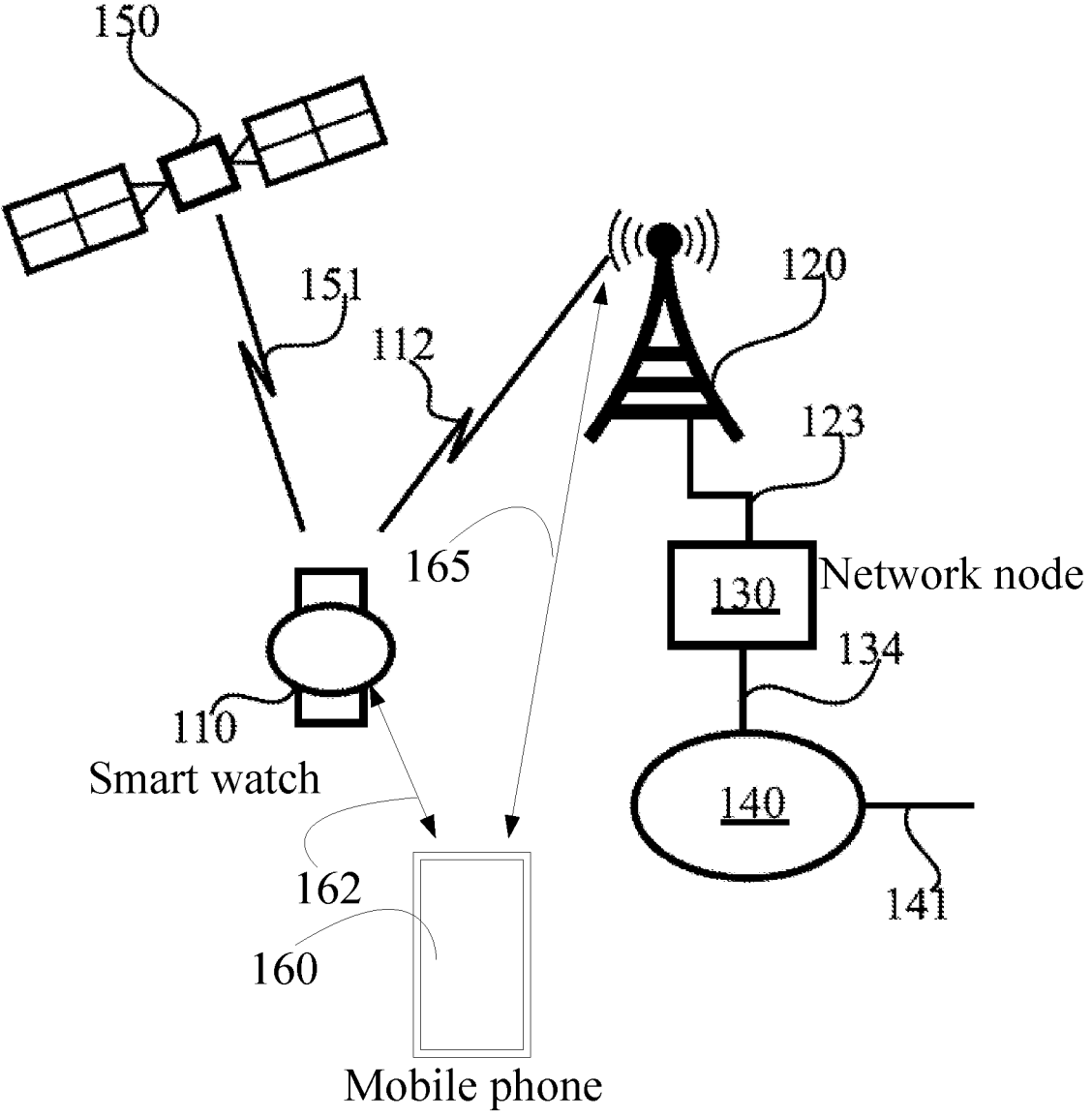
FIG. 1 shows, by way of example, a system.

FIG. 1 shows, by way of example, a system 100. The system comprises device 110, which may comprise, for example, a wearable device such as a smart watch, digital watch, or an activity bracelet. Device 110 may comprise a display, which may comprise a touchscreen display, for example. Said display may be limited in size. An example of a display limited in size is a display worn on a wrist. Device 110 may be powered, for example, by a rechargeable battery.

Device 110 may be communicatively coupled with a communications network. For example, in FIG. 1 the device 110 is coupled, via wireless link 112, with base station 120. Base station 120 may comprise a cellular or non-cellular base station, wherein a non-cellular base station may be referred to as an access point. Examples of cellular technologies include wideband code division multiple access, WCDMA, and long term evolution, LTE, while examples of non-cellular technologies include wireless local area network, WLAN, and worldwide interoperability for microwave access, WiMAX. Base station 120 may be coupled with network node 130 via connection 123. Connection 123 may be a wire-line connection, for example. Network node 130 may comprise, for example, a controller or gateway device. Network node 130 may interface, via connection 134, with network 140, which may comprise, for example, the Internet or a corporate network. Network 140 may be coupled with further networks via connection 141. In some embodiments, device 110 is not configured to couple with base station 120. Network 140 may comprise, or be communicatively coupled, with a back-end server, for example.

Communication between the device 110 and the communication network may be realized via another user device, e.g. a mobile phone 160 or a personal computer such as a laptop. The device 110 may communicate with a user device via a wireless or wired connection. For example, the device 110 may communicate with the mobile phone 160 using a wireless connection 162 such as Bluetooth. The mobile phone 160 may have an application installed which may be configured to establish a communication connection 165 with the network such that the device 110 may, for example, receive data from the network and transmit data to the network via the mobile phone 160. As an example of a wired connection, the device 110 may be connected via a data cable, e.g. universal serial bus (USB) cable, to a laptop. The laptop may have a program installed which may be used to sync data between the device 110 and a web service in the network, for example.

Device 110 may be configured to receive, from satellite constellation 150, satellite positioning information via satellite link 151. The satellite constellation may comprise, for example the global positioning system, GPS, or the Galileo constellation. Satellite constellation 150 may comprise more than one satellite, although only one satellite is illustrated in FIG. 1 for the sake of clarity. Likewise, receiving the positioning information over satellite link 151 may comprise receiving data from more than one satellite.

Alternatively or additionally to receiving data from a satellite constellation, device 110 may obtain positioning information by interacting with a network in which base station 120 is comprised. For example, cellular networks may employ various ways to position a device, such as trilateration, multilateration or positioning based on an identity of a base station with which attachment is possible or ongoing. Likewise a non-cellular base station, or access point, may know its own location and provide it to device 110, enabling device 110 to position itself within communication range of this access point. The device 110 may be part of an indoor positioning system employing wireless technologies such as Bluetooth or Wi-Fi for locating.

Device 110 may be configured to obtain a current time from satellite constellation 150, base station 120 or by requesting it from a user, for example. Once device 110 has the current time and an estimate of its location, device 110 may consult a look-up table, for example, to determine a time remaining until sunset or sunrise, for example. Device 110 may likewise gain knowledge of the time of year. In addition, device 110 is aware of time zones, and may detect changes of time zones.

Device 110 may comprise, or be coupled with, at least one sensor, such as, for example, an acceleration sensor, altimeter, moisture sensor, temperature sensor, heart rate (HR) sensor, ambient light sensor, and/or a blood oxygen level sensor. Device 110 may be configured to produce and store, using the at least one sensor, sensor data, for example in a time series that comprises a plurality of samples taken in a time sequence. In some embodiments, device 110 comprises an acceleration sensor and a HR sensor. In some further examples, device 110 comprises an acceleration sensor, a HR sensor and an altimeter.

The acceleration sensor, or motion sensor, may comprise e.g. a 6 degrees of freedom (DoF), or 9 DoF inertial measurement unit (IMU). The acceleration sensor may comprise e.g. a 3D digital accelerometer and/or a 3D digital gyroscope. A full-scale acceleration range of $\pm 2/\pm 4/\pm 8/\pm 16$ g and an angular rate range of $\pm 125/\pm 250/\pm 500/\pm 1000/\pm 2000/\pm 4000$ degrees per second (dps) may be supported. The acceleration sensor may comprise a 3D magnetometer, for example.

Measurement of the heart rate may be electrical or optical. Electrical measurement is based on electrocardiography sensors worn on a chest strap. Optical measurement is based on photoplethysmography (PPG) sensors which emit light from light emitting diodes through the skin, e.g. on a wrist, and measure how the light scatters off the blood vessels under the skin.

Referring back to sleep tracking, as an alternative to monitoring sleep with the smart watch 110 or other wearable device, a mobile phone 160 may be configured to track sleep of the user. When the phone is placed in the bed while a user is sleeping in the bed, accelerometer of the phone detects movement of the user. Sleep tracking may be performed based on the detected movement. In addition, sonic and/or sonar measures may be used in sleep tracking. The sleep data may be synchronized between the smart watch 110 and the mobile phone 160 such that a user is able to see the sleep data, collected by e.g. the mobile phone, on a display of the smart watch.

It may be that a user does not want to wear a smart watch during sleeping. However, the user may have a smart ring which may be more comfortable to wear during sleeping. Then, the sleep data may be synchronized between the smart ring and the smart watch.

For example, sleep tracking may be based on an algorithm, which uses a neural network-based model, as described in a white paper by Firstbeat Technologies, "A Sleep Analysis Method Based on Heart Rate Variability", Oct. 30, 2019. Inputs for the model comprise e.g. heart rate variability data, respiration rate derived from the heart rate variability, wrist/body movement, and time of day data. Background information of the user may be also provided to the algorithm, such as user's age, height, weight, and gender. The algorithm is capable to evaluate the bedtime and the wake-up time of a user. Based on the bedtime and the wake-up time, duration of the sleeping period may be calculated.

Figure 2:
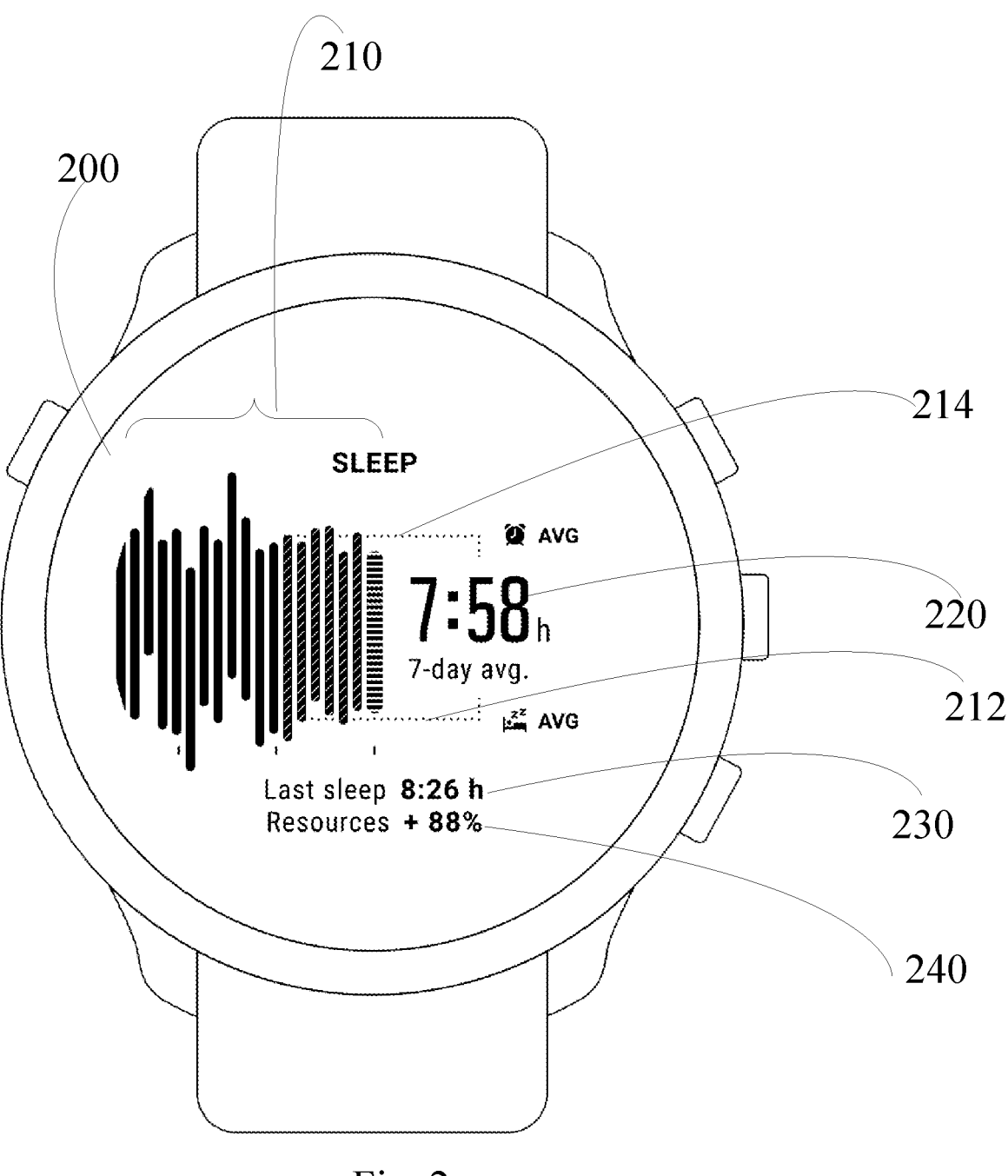
FIG. 2 shows, by way of example, a display of an apparatus.

FIG. 2 shows, by way of example, a display 200 of an apparatus, e.g. of a wearable device. Sleep data is displayed on the display or screen, i.e. a record of past sleeping activity is shown. A plurality of bars 210 represent sleeping periods; so that a bar represents a sleeping period corresponding to a day. In addition, a line illustrating average bedtime 212 and a line illustrating average wake-up time 214 are displayed. In addition, or alternatively, average bedtime and average wake-up time may be shown as numbers.

In addition, a running average length of sleeping periods 220 may be displayed. Duration or length of the latest sleep 230 may be displayed. A resource value 240 may be displayed. The resource value may indicate how well a user has recovered during previous sleep, or how much resources a user has gained during previous sleep. The resource value may be calculated based on heart rate variability and actigraphy, or the resource value may indicate a recovery time. The recovery time may be calculated, for example, as disclosed in US2011263993.

Figure 3:
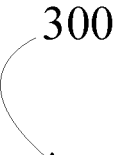
FIG. 3 shows, by way of example, a bar graph.
Figure 3:
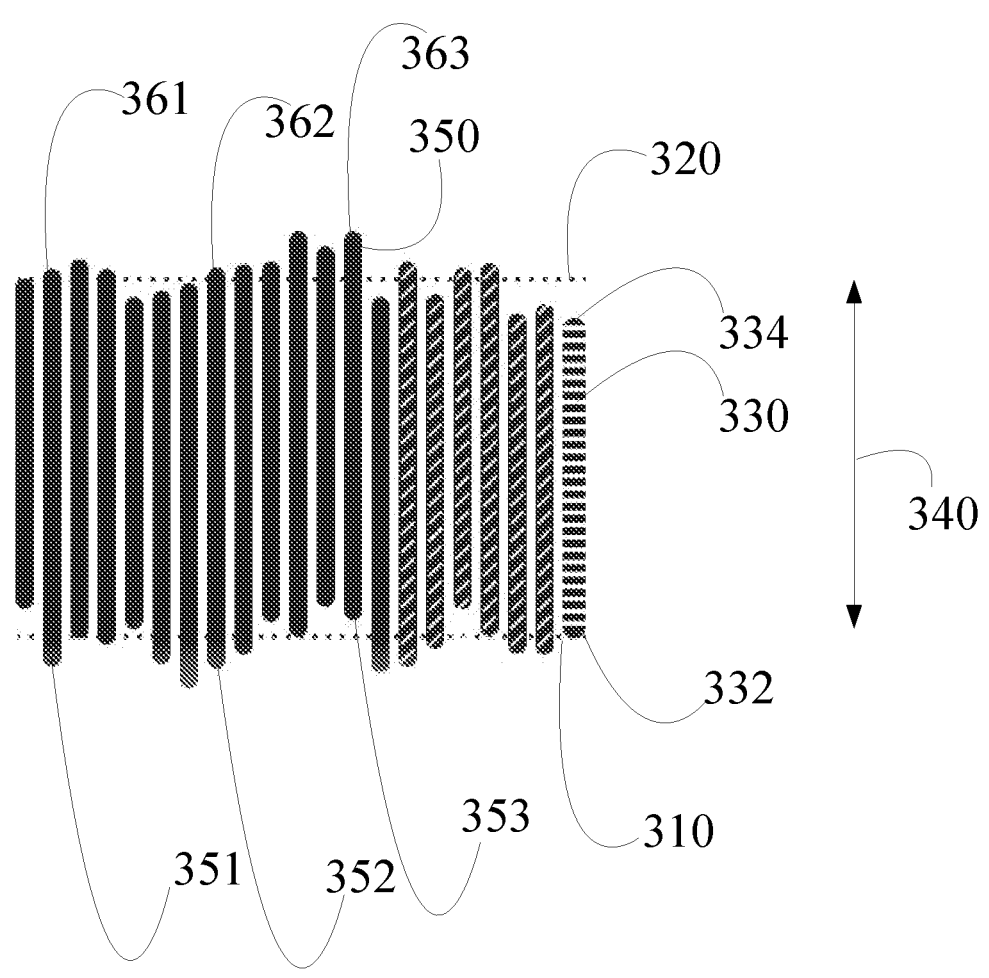

FIG. 3 shows, by way of example, a bar graph 300. An apparatus, such as a wearable device, obtains a starting time of a latest sleeping period and an ending time of the latest sleeping period. The starting and ending times may be obtained by tracking the sleep using the apparatus itself, or the starting and ending times may be received from another device, e.g. from a smart phone, configured to track sleep.

Displayed is a first line 310, which illustrates an average starting time of a sleeping period calculated based on a plurality of sleeping periods. The average starting time may be calculated based on sleeping periods tracked during a predetermined number of days. Starting time of a sleeping period may also be referred to as a bedtime.

Displayed is a second line 320, which illustrates an average ending time of a sleeping period calculated based on the plurality of sleeping periods. The average ending time may be calculated based on sleeping periods tracked during a predetermined number of days. Ending time of a sleeping period may also be referred to as a wake-up time.

Calculation of, for example, the average times, or running averages, may be performed by the wearable device, or by another device external to the wearable device. If calculation is performed by an external device, the wearable device may receive the average times from the external device, e.g. from a computer or cloud.

In at least some embodiments, the latest sleeping period is taken into account in calculation of the average starting time and/or the average ending time.

For example, the average bedtime and the average wake-up time may be calculated based on sleeping periods tracked during the last seven days. For example, the sleeping periods drawn with hashes in FIG. 3 may be taken into account when calculating the average bedtime and the average wake-up time. The quality and/or length of a sleeping period tracked long ago, e.g. over a week ago, might not have a significant impact on the wellbeing of a user today. The selected exemplary period of seven days includes a weekend which is considered to be beneficial for recovery of an average user who is working from Monday to Friday. People usually sleep longer in the weekends, which has an impact on the average length of sleeping periods, and on the average bedtimes and wake-up times as well.

Alternatively, period of six days, eight days, nine days or ten days may be used. It is to be noted, however, that if the period of days for calculating the average times is very long, it might not be suitable for purposes of sleep tracking.

The latest sleeping period is displayed graphically as a bar 330. A first end 332 of the bar 330 indicates the starting time of the sleeping period. A second end 334 of the bar 330 indicates the ending time of the sleeping period. The first end 332 and the second end 224 are displayed relative to the first line 310 and the second line 320. Length or height 340 of the bar 330 indicates a length or duration of the sleeping period.

A plurality of previous sleeping periods, i.e. periods tracked before the latest sleeping periods, are displayed as bars. The first ends 351, 352, 353 of the bars indicate starting times of the sleeping periods. The second sends 361, 362, 363 of the bars indicate ending times of the sleeping periods. The first ends 351, 352, 353 and the second ends 361, 362, 363 are displayed relative to the first line 310 and the second line 320. Lengths or heights of the bars indicate lengths or durations of the sleeping periods. This kind of sleep regularity graph enables the user to see whether the user has been able to maintain a healthy sleep schedule.

The number of sleep bars that are shown on the regularity graph may be dependent on a size of a display. For example, for a smart watch display, a suitable number may be e.g. 20 previous sleeping periods and the latest sleeping period, which means that a period of three weeks (21 days) is shown on the graph. A user may see older data by scrolling the graph backward by swiping the display.

In the example of FIG. 3, it may be deduced based on the bar of the latest sleeping period 330 that the user has started sleeping at the average bedtime, since the first end 332 of the bar is located at the first line 310. It may also be deduced that the user has woken up earlier than the average wake-up time, since the second end 334 of the bar is located below the second line 320.

As another example, it may be deduced that eight days ago, the user has started to sleep later than the average bedtime, since the first end 353 of a bar 350 is located above the first line 310. Then, the user has woken up later than the average wake-up time, since the second end 363 of the bar 350 is located above the second line 320.

In the example of FIG. 3, the bars are in vertical positions. The latest sleeping period illustrated by the bar 330 may be displayed on the right hand side of the graph. The latest sleep bar may be displayed as a thicker bar compared to the bars illustrating previous sleeping periods. For example, the width of the latest sleep bar may be e.g. 5 dp (pixels), and the width of the previous sleep bars may be e.g. 4 dp. Spacing between the bars may be e.g. 2 dp.

The colour of the bar of the latest sleeping period may be darker than the colour of the bars of the previous sleeping periods. For example, the colour may be displayed using a gradient such that the lightest colour is reserved for a bar illustrating the earliest sleeping period displayed in the graph and the darkest colour is reserved for the latest sleep bar. Alternatively, the latest sleep bar may be the darkest, the previous six bars may be lighter with alpha value 0.5, for example, and the next 14 bars may be even more lighter with alpha value 0.3, for example. When the sleep bars are grouped using colour hues, it enables the user to more easily see e.g. the sleep bars of the current week. In the example of FIG. 3, different hashes have been used instead of colours for highlighting the latest sleeping period and the current week.

Alternatively the bars being in vertical positions, the graph may be displayed such that the bars are in horizontal positions. Then, the first line may be on the left hand side, and the second line on the right hand side, for example. The latest sleeping period may be the lowest bar or the uppermost bar.

Distance between the first line 310 and the second line 320 indicates average duration of the sleeping periods. The distance may be the same in pixels despite of the average duration of the sleeping periods. In other words, the positions of the first line and the second line may be fixed on the display. Positioning and dimensions of the sleep bars are relative to the first line 310 and the second line 320 and the values, i.e. times, they represent. The lines being fixed on the same place on the display, the display remains easily readable even though the average length of sleep would be very short. If the display area for a bar graph would be fixed based on clock times, for example, showing time between 21:00 and 09:00, short sleep bars may be displayed as unnecessarily short, which may be complicated to interpret.

Certain amount of time correspond to certain amount of pixels on the display or the screen. Relationship between the amount of time and a number of pixels is dependent on the time difference between the average bedtime and wake-up time. The smaller the average duration of sleep, the larger the time unit is as pixels. Let us denote a distance between the first line 310 and the second line 320 in pixels as sleep_avg_dp, wherein the dp is a device-independent pixel or a density-independent pixel. Let us denote a difference between the average bedtime and wake-up time in minutes as sleep_avg_min.

Then, one minute time difference in pixels is given as:

$$sleep\_avg\_dp/sleep\_avg\_min.$$

For example, the distance between the first line 310 and the second line 320 in pixels may be set to 80 dp. Let us consider that the average sleeping period of a user is 8 h. If the user wakes up 60 minutes later than average, the sleep bar is drawn such that the second end of the bar is above the second line. Number of pixels for that portion of the bar that is above the second line may be calculated as follows:

$$60*sleep\_avg\_dp/sleep\_avg\_min=60*(80/(8*60))=10\ dp.$$

Thus, the bar may be displayed such that the second end is located 10 pixels above the second line 320, i.e. the average wake-up line.

Irregular sleep or missing sleep data may cause difficulties in displaying the bar graph, and/or displaying and presenting sleep data in other user interfaces. For example, a single sleeping period may occur on two different days, when extending over a midnight, i.e. when the user has started to sleep before midnight and wakes up in the morning of the next day. As another example, it may be that a user does not track sleep every night, or for some other reason, sleep data might not be available for every day.

Thus, a date assigned for a sleeping period may be defined based on the ending time of the sleeping period. This way, a processor or a control unit configured to draw the graph is aware how to display the graph, wherein slots are reserved for different dates.

Figure 4:
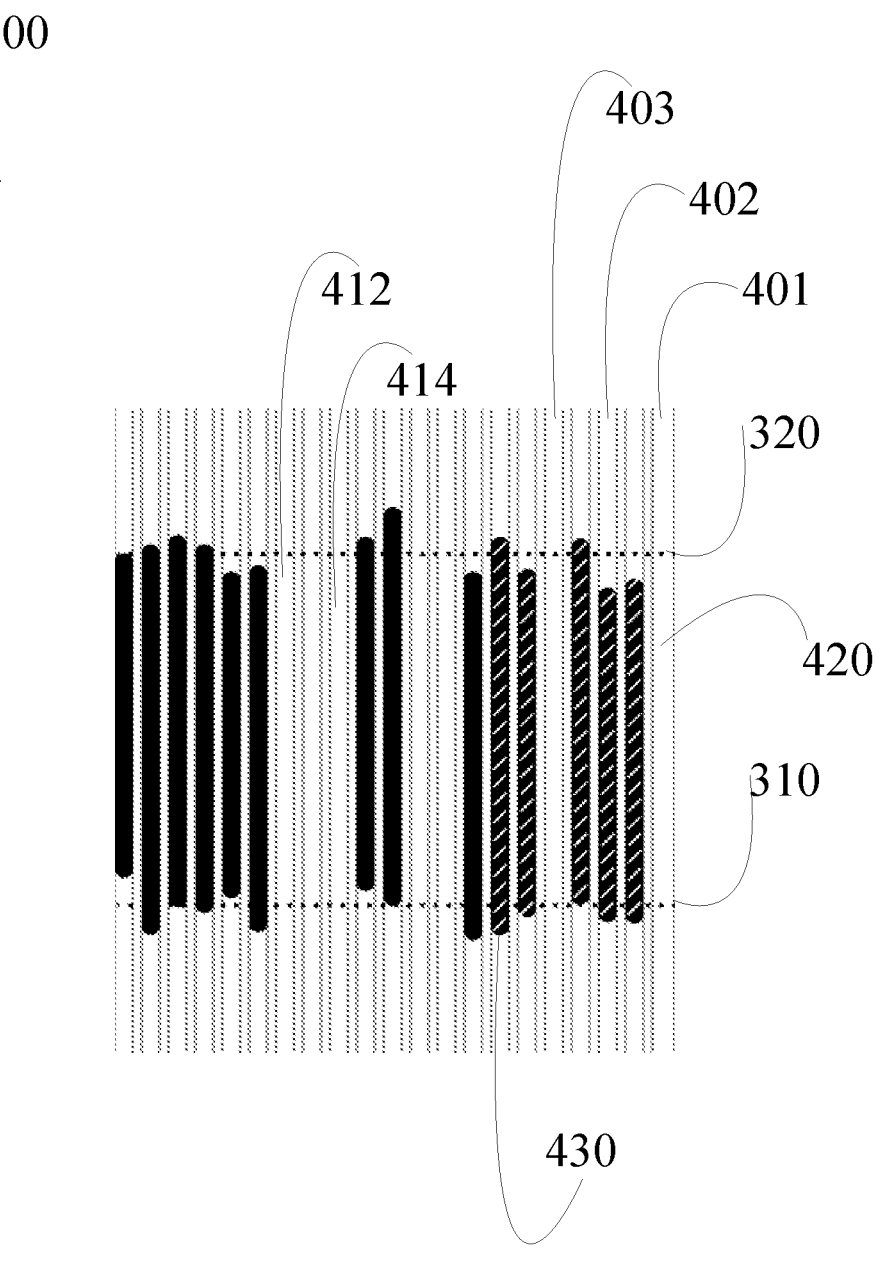
FIG. 4 shows, by way of example, a bar graph.

FIG. 4 shows, by way of example, a bar graph 400. Each slot 401, 402, 403 in the graph is reserved for a different date. Sleep bars that represent sleeping periods are drawn on slots that have a matching date. Sleep bars are displayed adjacently in the graph. For example, the rightmost slot 401 is the current date, and the following slots on the left represent past days in sequential order. If there is no data for a certain day, an empty space or slot may be displayed instead of a sleep bar, as shown by empty spaces 403, 412, 414, for example.

Referring back to FIG. 2, the apparatus may be configured to display a running average length of sleeping periods 220 calculated over of a plurality of sleeping periods. For example, average of sleeping periods of seven previous days may be calculated and displayed on the display. The current day may be included in the seven days. Period of seven days includes a weekend, which is considered to be beneficial for recovery of an average user who is working from Monday to Friday. People usually sleep longer in the weekends, which has an impact on the average length of sleeping periods. Calculation of a running average and displaying that to the user is beneficial in the sense that a single night might not be of great importance for a user, but a running average is a better indicator of sleeping. However, an average over a very long period might not be a good indicator, since possible irregularities usually have a minor impact on an average value, which is calculated over a long period. Suitable period for a running average may be, for example, six, seven, or eight days. Quality and/or length of a sleeping period tracked long ago, e.g. over a week ago, might not have a significant impact on a wellbeing of a user today.

In case of days without sleeping period(s), i.e. empty slots, may be discarded from calculation of the running average. Thus, when calculating the running average over a plurality of days, e.g. seven days, only those days of the plurality of days are included in the calculation that have sleeping data recorded. Let us consider that the running average is calculated over seven days, i.e. from the current day 420 to the seventh day 430. In some situations, the running average may actually display an average calculated over a smaller amount of days than seven days, e.g. over four or five days, if the period of seven days comprises days without sleeping data. In the example of FIG. 4, there are five days with recorded sleep data between the current day 420 and the seventh day 430. Thus, the running average would be calculated over these five days.

In the morning, if there is no sleep data recorded before user's average wake-up time, an indication may be displayed on the display. For example, a text "No sleep data from last night" or "No sleep data for today" may be displayed. If the user has not started sleeping before average wake-up time, slot of that day, e.g. Saturday, may be left empty. However, if the user starts sleeping after average wake-up time on Saturday, and wakes up during the same day, the sleeping period may be saved for Saturday.

It may be that a user sleep multiple times per day, that is, a plurality of sleeping periods may be tracked and detected for a same day. It may be defined in the settings of the sleep graph that short naps are ignored. A threshold value may be set for a length of the sleeping period. If the sleeping period is longer than defined by the threshold, the sleeping period is treated as a sleeping period. Also time zone changes may cause situations wherein there are multiple sleeping periods detected for a same day.

Figure 5:
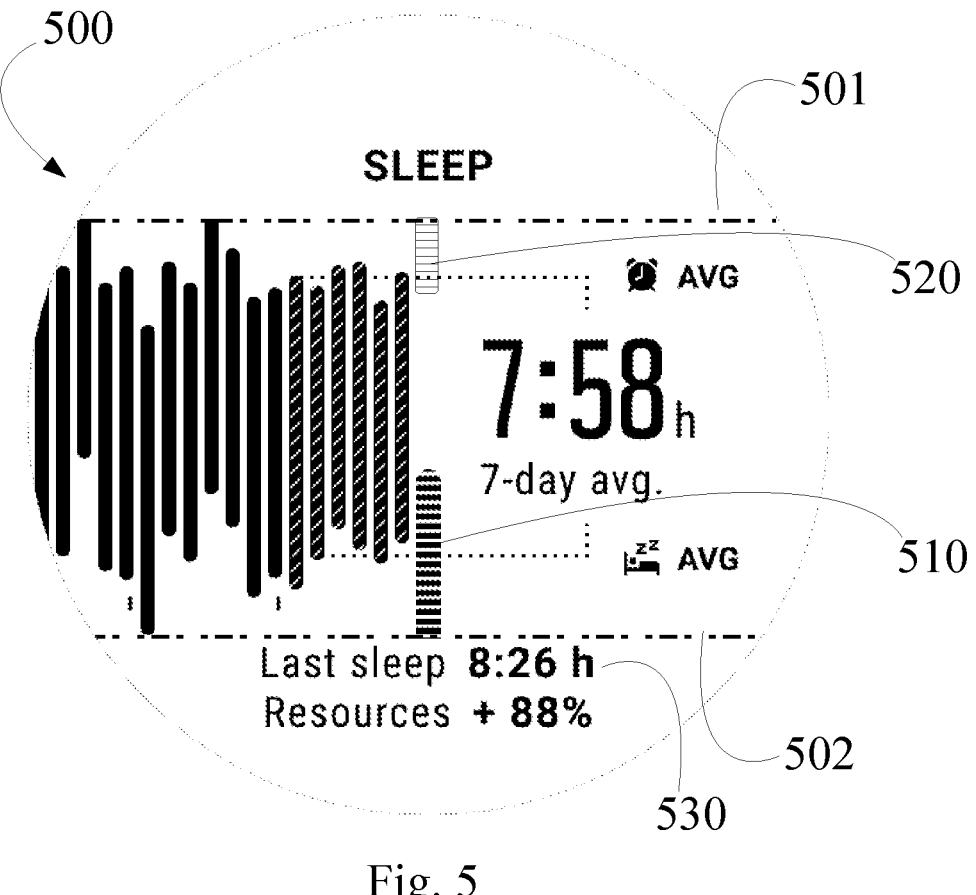
FIG. 5 shows, by way of example, a display of an apparatus.

FIG. 5 shows, by way of example, a display of an apparatus. Displayed is a bar graph 500 in a case with a plurality of sleeping periods for a same day. FIG. 5 shows that a sleeping period 510 and a second sleeping period 520 are tracked during the same day. The second sleeping period 520 is not displayed on the display of the apparatus, but is shown in FIG. 5 for illustrative purposes. The first sleeping period 510 has ended after midnight, since the date assigned for that is the same date as for the second sleeping period 520. Thus, it may be deduced that the average bedtime in this example is at or after midnight. As shown in FIG. 5, the lines showing the average bedtime and the average wake-up time may be drawn in a way that the lines extend to the seventh day. However, the plurality of sleeping bars beyond the seventh day are still drawn relative to the average lines.

In FIG. 5, it has been taken into account only the sleeping period that is nearest to the user's average. In other words, the first sleeping period 510 which covers more of the average sleeping time of the user, is displayed and taken into account in calculation of the running average. Length of the first sleeping period may be shown as the length of the last or latest sleep 530.

The plurality of sleeping periods, e.g. the first sleeping period 510 and the second sleeping period 520 may, however, be displayed as separate bars on the same slot.

Displays of the wearable devices tend to be small, and it may be cumbersome to display bars of sleeping periods that are at least partly clearly outside of the average sleeping time. Dashed lines 501, 502 are shown in FIG. 5 to limit the display area of the bar graph. In case a sleeping period extends over these lines, a bar corresponding to the sleeping period may be cut when intersecting with the line 501, 502. Alternatively, the bar may be extended over the line but faded out.

The plurality of sleeping periods, also during the same day, may be all taken into account in calculation of the running average. Thus, the average duration of a sleeping period may be calculated as $$\text{avg duration} = (\text{total duration of sleep during 7 days})/(\text{amount of sleep periods during 7 days})$$

It is noted that as described above, the running average may be calculated over other amount of days than seven days. For example, the running average may be calculated over six, seven, eight, nine, ten, or eleven days.

Time zone often changes when a user travels. Waking up on a different time zone may cause faulty duration of sleeping periods, and wrong wake-up times displayed to the user. When detecting a change of a time zone, it may be taken into account when displaying sleep data. This way, the sleep data may be displayed to the user such that it is understandable to the user despite of the time zone changes.

Figure 6:
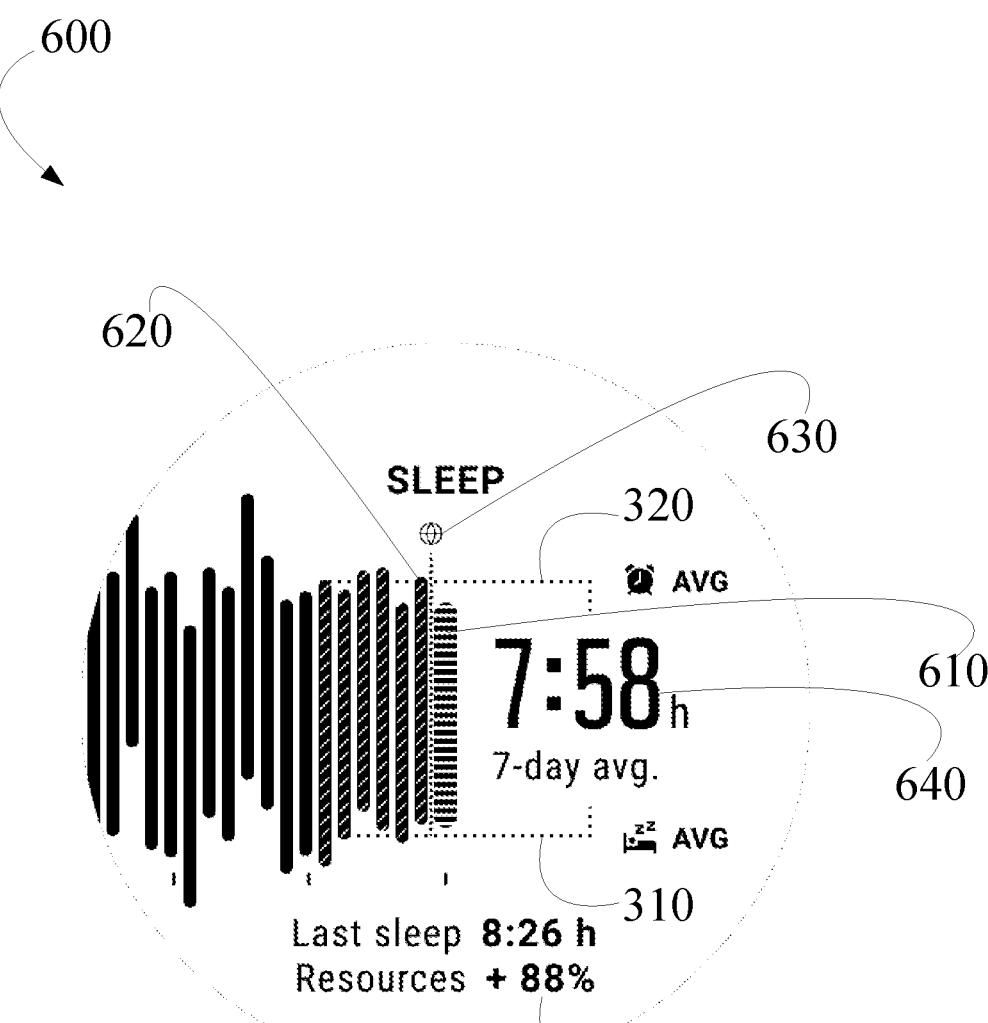
FIG. 6 shows, by way of example, a display of an apparatus.

FIG. 6 shows, by way of example, a display of an apparatus. Displayed is a bar graph 600. In response to detecting a change of a time zone, all the sleeping periods visible in the graph may be displayed such that the starting times and the ending times are displayed as obtained originally. That is, if a user has started sleeping at 23:00 in a time zone which is different than the current time zone, the starting time of the sleeping period is displayed as 23:00 also at the current time zone. This applies to a situation, when a single sleeping period has occurred in a same time zone, or in other words, that the time zone has not changed during a sleeping period.

Let us consider that the ending time of the latest sleeping period 610 (today) is in a different time zone than the ending time of the second last sleeping period 620 (yesterday). In response to detecting that dates, or ending times, of subsequent sleeping periods have a time zone difference, an indicator 630 of a change of a time zone may be displayed to the user. For example, the indicator may be displayed between the slots for today and yesterday.

However, time zone may change during a sleeping period. For example, a user may sleep in an airplane, which flies over a plurality of time zones. Then, a single sleeping period may have a bedtime and wake-up time that are recorded in different time zones. Duration of a sleeping period may be calculated such that it is not affected by time zone changes. The wake-up time defines the date of the sleeping period.

The bedtime may be corrected such that it is converted to the time of the current time zone, i.e. the time zone of the wake-up time. Then, if the length of the sleeping period is calculated as a difference between the corrected bedtime and the wake-up time, the length of the sleeping period corresponds to a correct amount of sleep. In response to detecting a time zone change during a sleeping period, an indicator of a change of a time zone may be displayed to the user.

The display of the apparatus may be a touch screen, and the user may interact with the apparatus via the touch screen. For example, the user may scroll the bar graph in order to see sleeping data of previous days. Scrolling may be realized by providing a swiping interaction to a touchscreen used to display the bar graph, for example. The lines 310, 320 illustrating the average bedtime and waking-up time are displayed in fixed positions on the display. The times of the average lines 310, 320 may reflect or be indicative of the current situation, that is, a period of the latest days with respect to a current day, e.g. seven latest days, is used in calculation of the average bedtime and the average wake-up time. Then, the previous bars that become visible on the display when scrolling the graph will be scaled and displayed relative to the current average times. The previous bars are indicative of sleeping periods in history or past. This way, the user may draw conclusions based on the older sleep data with respect to the current situation.

Let us consider a period of seven days as a window. The bars shown in the window change as the user scrolls the graph forward and/or backward. Alternatively to the current average times, average times for the lines 310, 320 may be calculated based on those days that are shown in the window. This way, the user may review the situation in the history. The user may select, by providing user input, whether the average times are to be calculated based on the days that are shown in the window.

The running average 640 may be updated based on those days that are in the window, also in situation wherein the times of the average lines are calculated based on the current situation. Empty days may be discarded from calculation of the running average and the average times for the lines 310, 320.

Resource value 650 may be shown based on the bar, which is shown in the slot of the latest sleeping period, that is, the rightmost slot when the bars are shown vertically. When the user scrolls the graph, the resource value may be updated such that it reflects the resource value of that particular day the bar of which is shown in the slot of the latest sleeping period.

A user may use a swiping action to scroll the graph forward and/or backward. A user may select one bar by pushing it, and then see more details of that specific sleeping period. For example, the user may see different sleep states, heart rate during the sleep, etc.

Figure 7:
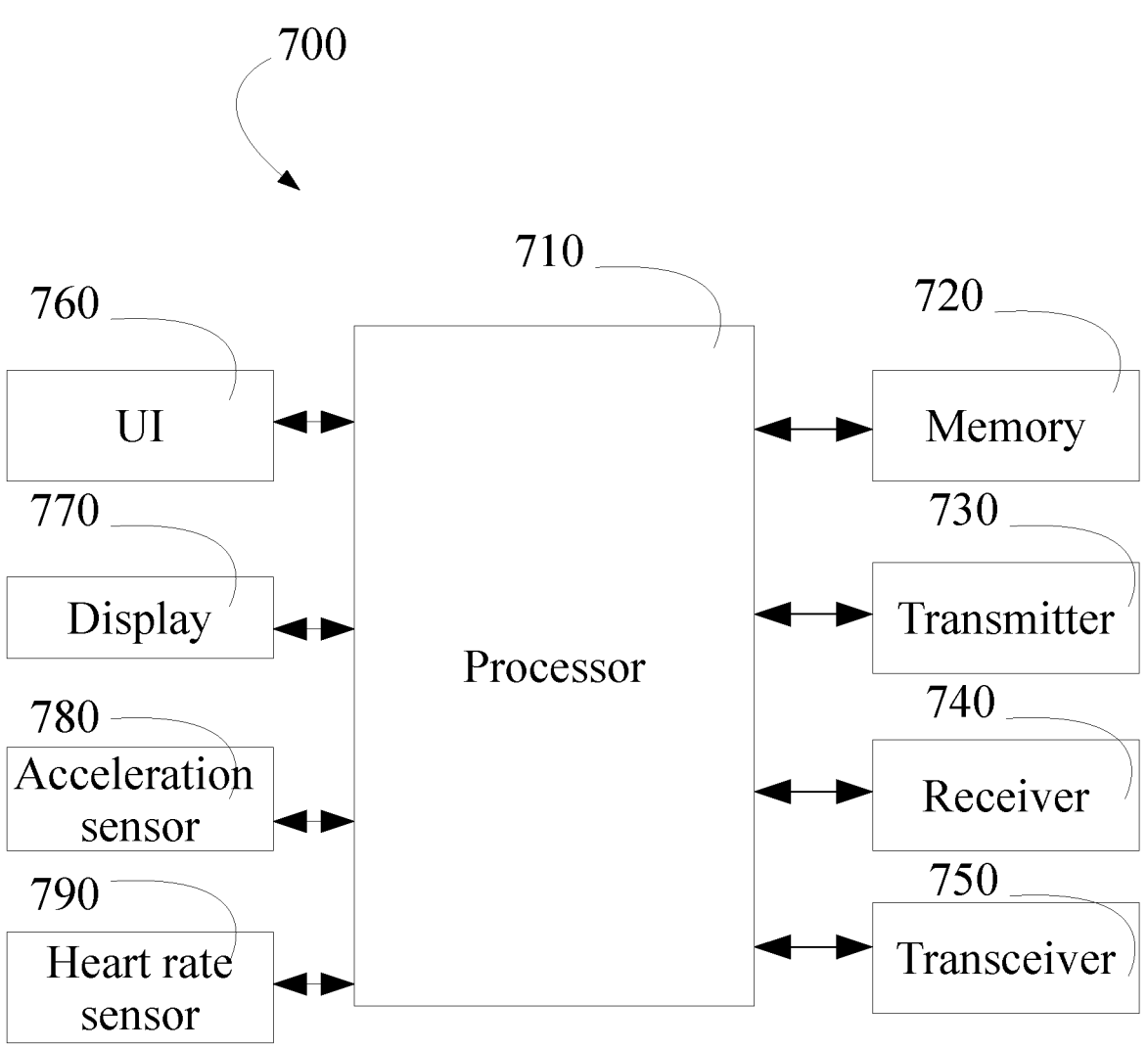
FIG. 7 shows, by way of example, a block diagram of an apparatus.

FIG. 7 shows, by way of example, a block diagram of an apparatus 700. Illustrated is device 700, which may comprise, for example, a wearable device such as a sport watch or smart watch 110 of FIG. 1. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core designed by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to device 700 but accessible to device 700. Memory 720 may store sleep data measured by the device itself or received from another device.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise a port for a cable for wired data communication or charging. For example, the device may comprise a USB port.

Device 700 may receive sleep data from external device using the receiver 740 and/or the transceiver 750, for example. Device may receive satellite positioning information using the receiver 740.

Device 700 may comprise user interface, UI, 760. UI 760 may comprise at least one of a display, buttons, a keyboard, a touchscreen, a vibrator arranged to signal to a user by causing device 700 to vibrate, a speaker and a microphone. A user may be able to operate device 700 via UI 760, for example to scroll the bar graph to see older data, to manage digital files stored in memory 720 or on a cloud accessible via transmitter 730 and receiver 740, or via NFC transceiver 750.

Device 700 may comprise, or may be coupled to, a display 770. The display may be operated by the processor(s). For example, the display may be configured to display a bar graph comprising sleeping data. In a beneficial embodiment, the display 770 may be circular in shape, e.g. when device 700 is a wrist-watch type device such as a smart watch or a wristop computer. Such a display has limited space for UI elements and the display of the sleep data requires solutions such as presented herein.

Device 700 may comprise sensors, such as an acceleration sensor 780, heart rate sensor 790, altimeter, moisture sensor, temperature sensor, ambient light sensor, and/or a blood oxygen level sensor.

FIG. 8 shows, by way of example, a flowchart of a method 800. The method may be performed by a wearable device 110 of FIG. 1, such as a smart watch, or by a control device configured to control the functioning thereof, when installed therein. The method 800 comprises obtaining 810, by a wearable device, a starting time of a latest sleeping period. The method 800 comprises obtaining 820, by a wearable device, an ending time of the latest sleeping period. The method 800 comprises displaying 830, on a display of the wearable device, a first line illustrating an average starting time of a sleeping period calculated based on a plurality of sleeping periods over a plurality of days. The method 800 comprises displaying 840 a second line illustrating an average ending time of a sleeping period calculated based on the plurality of sleeping periods over the plurality of days. The method 800 comprises displaying 850 the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period.

The method and apparatus as disclosed herein enable the device, e.g. the wearable device, to display the sleep data in a clear way even on a smaller display, such as on a display of a wearable device, e.g. a smart watch. At least some embodiments enable displaying the sleep data clearly in various situations, e.g. in situations when the user is travelling across different time zones.

The invention claimed is:

1. A smart watch comprising at least one processor; and at least one memory including computer program code, the at least one memory and the computer program code configured to, with the at least one processor, cause the smart watch at least to perform:
    obtaining a starting time of a latest sleeping period;
    obtaining an ending time of the latest sleeping period;
    displaying, on a display of the smart watch, a first line illustrating an average starting time of a sleeping period calculated based on a plurality of sleeping periods over a plurality of days;
    displaying a second line illustrating an average ending time of a sleeping period calculated based on the plurality of sleeping periods over the plurality of days; and
    displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period; and
    receiving user input via the display of the smart watch, wherein the user input is a swiping action for scrolling a graph forward and/or backward to see older data, wherein the older data comprises previous bars that become visible on the display when scrolling the graph, wherein previous bars are scaled and displayed relative to the first line and the second line and are indicative of sleeping periods in the past.

2. The smart watch of claim 1, further caused to perform:
    displaying a plurality of sleeping periods, comprising the latest sleeping period and previous sleeping periods, as bars such that first ends of the bars indicate starting times of the sleeping periods and second ends of the bars indicate ending times of the sleeping periods, wherein the first ends and the second ends are displayed relative to the first line and the second line, and wherein lengths of the bars indicate lengths of the sleeping periods.

3. The smart watch of claim 2, further caused to perform:
    assigning a date for a sleeping period of the plurality of sleeping periods based on the ending time of the sleeping period; and
    displaying the plurality of sleeping periods as bars adjacently in a graph such that slots in the graph are reserved for different dates.

4. The smart watch of claim 3, further caused to perform:
    assigning a same date for a plurality of sleeping periods with ending times on a same day; and
    displaying that sleeping period of the plurality of sleeping periods with ending times on the same day which is nearest to an average sleeping period of a user.

5. The smart watch of claim 1, further caused to perform:
    calculating a running average length of sleeping periods over the plurality of days; and
    displaying the running average length of sleeping periods.

6. The smart watch of claim 5, wherein calculation of the running average discards one or more days of a plurality of days without recorded sleeping periods.

7. The smart watch of claim 3, further caused to perform:
    assigning a same date for a plurality of sleeping periods with ending times on a same day; and
    calculating a running average length of sleeping periods over the plurality of days taking into account the plurality of sleeping periods assigned the same date by dividing total duration of sleep during the plurality of days with a number of the plurality of sleeping periods during the plurality of days.

8. The smart watch of claim 1, wherein the plurality of days is seven days.

9. The smart watch of claim 2, further caused to perform:
    detecting a change of a time zone; and
    displaying the plurality of sleeping periods such that the starting times and the ending times are displayed as obtained.

10. The smart watch of claim 2, further caused to perform:
    in response to detecting that the ending times of subsequent sleeping periods have a time zone difference, displaying an indicator of the change of the time zone.

11. The smart watch of claim 1, further caused to perform:
    in response to detecting a change of a time zone during a sleeping period, applying a time zone correction to the starting time of the sleeping period.

12. The smart watch of claim 1, wherein the first line and the second line are displayed in fixed positions on the display, despite a change of times that the first line and/or the second line illustrates.

13. The smart watch of claim 1, further caused to perform:
    displaying bars, that become visible on the display in response to the swiping action and are indicative of sleeping periods in history, relative to
    the first line illustrating the average starting time of the sleeping period calculated based on the plurality of sleeping periods over the plurality of days; and
    the second line illustrating the average ending time of the sleeping period calculated based on the plurality of sleeping periods over the plurality of days, wherein the plurality of days are the latest days with respect to a current day.

14. A method comprising:

obtaining, by a smart watch, a starting time of a latest sleeping period;

obtaining, by the smart watch, an ending time of the latest sleeping period;

displaying, on a display of the smart watch, a first line illustrating an average starting time of a sleeping period calculated based on a plurality of sleeping periods over a plurality of days;

displaying a second line illustrating an average ending time of a sleeping period calculated based on the plurality of sleeping periods over the plurality of days; and displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period; and receiving user input via the display of the smart watch, wherein the user input is a swiping action for scrolling a graph forward and/or backward to see older data, wherein the older data comprises previous bars that become visible on the display when scrolling the graph, wherein previous bars are scaled and displayed relative to the first line and the second line and are indicative of sleeping periods in the past.

15. A non-transitory computer readable medium comprising program instructions that, when executed by at least one processor, cause a smart watch at least to perform:

obtaining, by the smart watch, a starting time of a latest sleeping period;

obtaining, by the smart watch, an ending time of the latest sleeping period;

displaying, on a display of the smart watch, a first line illustrating an average starting time of a sleeping period calculated based on a plurality of sleeping periods over a plurality of days;

displaying a second line illustrating an average ending time of a sleeping period calculated based on the plurality of sleeping periods over the plurality of days; and displaying the latest sleeping period graphically as a bar such that a first end of the bar indicates the starting time and a second end of the bar indicates the ending time, wherein the first end and the second end are displayed relative to the first line and the second line, and wherein a length of the bar indicates a length of the latest sleeping period; and receiving user input via the display of the smart watch, wherein the user input is a swiping action for scrolling a graph forward and/or backward to see older data, wherein the older data comprises previous bars that become visible on the display when scrolling the graph, wherein previous bars are scaled and displayed relative to the first line and the second line and are indicative of sleeping periods in the past.

16. The smart watch of claim 2, further caused to perform:

calculating a running average length of sleeping periods over the plurality of days; and displaying the running average length of sleeping periods.

17. The smart watch of claim 3, further caused to perform:

calculating a running average length of sleeping periods over the plurality of days; and displaying the running average length of sleeping periods.

18. The smart watch of claim 16, wherein calculation of the running average discards one or more days of a plurality of days without recorded sleeping periods.

19. The smart watch of claim 17, wherein calculation of the running average discards one or more days of a plurality of days without recorded sleeping periods.

* * * * *